United States Patent [19]

Coury et al.

[11] 3,725,450

[45] Apr. 3, 1973

[54] PROCESS FOR THE PREPARATION OF ISOCYANATES FROM ACYL AZIDES

[75] Inventors: Arthur J. Coury, Minneapolis; Edgar R. Rogier, Hopkins, both of Minn.

[73] Assignee: General Mills Chemicals, Inc., Minneapolis, Minn.

[22] Filed: Oct. 5, 1970

[21] Appl. No.: 78,199

[52] U.S. Cl. ............... 260/453 P, 260/349, 260/407, 260/453 AL
[51] Int. Cl. ............................................. C07c 119/04
[58] Field of Search ......................... 260/453 P, 349

[56] References Cited

UNITED STATES PATENTS 2,514,328   7/1950   Jones ............................. 260/453 X
3,324,148   6/1967   Cotter ............................ 260/349

OTHER PUBLICATIONS

Organic Reactions, Vol. 111, John Wiley & Sons, Inc. pp. 373–376 (1956).

*Primary Examiner*—Lewis Gotts
*Assistant Examiner*—Dolph H. Torrence
*Attorney*—Anthony A. Juettner and Gene O. Enockson

[57] ABSTRACT

Organic acyl azides and isocyanates are prepared from acyl halides and metal azides using acetonitrile in the reaction medium.

9 Claims, No Drawings

PROCESS FOR THE PREPARATION OF ISOCYANATES FROM ACYL AZIDES

The present invention relates to a new process for preparing organic isocyanates and acyl azides. More particularly, it relates to such a process employing acetonitrile.

We have discovered that acetonitrile offers unique advantages over other solvent systems as the reaction medium for the conversion of acyl halides to acyl azides and the decomposition of the latter to isocyanates. It displays catalytic activity unsurpassed among anhydrous solvent systems previously reported—e.g. dimethyl formamide alone or in combination with heptane. Moreover, it is considerably less expensive than dipolar aprotic solvent systems, is readily recovered during workup and provides products of high functional purity. Since the acetonitrile based system is anhydrous, side reactions which often occur in aqueous processes for preparing azides are virtually eliminated. Our new process is readily scaled up and offers convenience and flexibility in workup with good recovery of solvent and good to excellent yields of high-quality product. Any side products (including carbamoyl azide and traces of biuret) which may form in small amounts in the process are generally readily removed by distillation of the product.

Any of a wide variety of organic acyl halides can be used as the starting materials in the process of the present invention. Such acyl halides may be mono, di, tri or higher in functionality although the dihalides are preferred since they yield diisocyanates which are highly useful commercially for the preparation of polyurethanes, polyureas and the like through reaction with active hydrogen containing organic compounds. Of the acyl halides the acyl chlorides are preferred due primarily to their more ready availability and/or preparation. The following are representative of various organic acyl halides which find use in our process: aliphatic acyl halides--octanoyl chloride, decanoyl chloride, 10-undecanoyl chloride, dodecanoyl chloride, palmitoyl chloride, oleoyl chloride, stearoyl chloride, cyclohexane acid chloride, suberoyl chloride, sebacoyl chloride, n-decane-1,10-dicarboxylic acid dichloride, n-hexadecane-1,16-dicarboxylic acid dichloride, and the like; aromatic acyl halides—benzoyl chloride, terephthaloyl chloride, isophthaloyl chloride, 1,5-naphthalene dicarboxylic acid chloride, and the like; and complex materials such as the diacid chloride of 1,1,3-trimethyl-5-carboxy-3(p-carboxyphenyl)indane, the chlorides of polymeric fat acids and the like.

The halides of polymeric fat acids represent one preferred group of starting materials. The halogenation or chlorination of the acids can be carried out by conventional procedures using $PCl_3$ and the like. Polymeric fat acids are well known and commercially available. One method of preparation of polymeric fat acids can be seen in U. S. Pat. No. 3,157,681. The polymeric fat acids useful in preparing the starting acyl halides are produced by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

It is also preferred that the polymeric fat acids used in the preparation of the halides are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with the platinum family of catalysts.

The acetonitrile may be used in widely varying amounts as long as a sufficient amount thereof is present to accelerate the reaction of the acyl halide and the metal azide. Preferably, however, the acetonitrile will be used in amounts of about 10 to 300 percent by weight based on the weight of the acyl halide.

The acetonitrile may be used alone or in combination with other solvents in the preparation of the acyl azides. When preparing aromatic isocyanates, a higher boiling decomposition medium than acetonitrile is required for the decomposition of the aromatic acyl azide. Thus the azide may first be formed in the acetonitrile and then the latter can be removed and a higher boiling solvent added or a higher boiling solvent can merely be added to the azide-acetonitrile solution. Additionally, a co-solvent can be added prior to the azide formation reaction and thus the aromatic isocyanate can be formed in one step.

Any of a wide variety of co-solvents may be used in our process as described above. These solvents are preferably the aliphatic, alicyclic or aromatic hydrocarbons such as heptane, cyclohexane, toluene, benzene or a chlorinated hydrocarbon such as methylene chloride, chlorobenzene and the like. The ratio of the co-solvent to the acetonitrile is not critical but, of course, where an aromatic isocyanate is being prepared, the over-all solvent would provide the medium having a sufficiently high boiling point to accommodate the decomposition of the aromatic acid azide.

The metal azides which may be employed in the production of the acyl azides and isocyanates in accordance with our invention are preferably the alkali metal and alkaline earth metal azides such as potassium azide, sodium azide, and the like. It is especially preferred to use sodium azide. The metal azide will be used in an amount at least equivalent to the equivalents of acyl halide. And it is especially preferred to use the metal azide in an amount of from more than 1 to 3 times the equivalents of acyl halide. An excess considerably accelerates the azide formation.

When an acyl is to be prepared, the reaction temperature is maintained below that temperature where significant decomposition of azide to isocyanate occurs. Preferably, the reaction temperature for acyl azide preparations in accordance with the present invention will be in the range of about $-10°$ to $25°C$. When an isocyanate is to be prepared in one step or as a second step including a co-solvent, the reaction medium will be heated to a high enough temperature to decompose the acyl azide. Preferably, decomposition temperatures in the range of about $60°$ to $150°C$. will be used. The reaction medium is also preferably mixed, such as by stirring or other agitation during the acyl azide forming reaction.

The following Examples serve to illustrate certain preferred embodiments of the invention without being limiting.

EXAMPLE I

Thirty one grams (0.1 eq.) dimer acid chloride was dropped into a stirred slurry of 7.15 g. (0.11 eq.) sodium azide and 43 ml. acetonitrile which had been heated to reflux. The dimer acid chloride had the formula ClOC—D—COCl where D is the 34 carbon atom divalent hydrocarbon radical of the dimerized fat acid obtained by polymerizing, distilling and hydrogenating (in the presence of palladium) the mixture of fat acids derived from tall oil (composed of approximately 40–45% linoleic and 50–55% oleic, such %'s being by weight). The addition of the dimer acid chloride took 11 minutes and then refluxing (82°C.) was continued for another 1 ¾ hours. The course of the reaction was followed by infrared analysis which revealed that the conversion of dimer acid chloride to dimeryl isocyanate (OCN—D—NCO) was complete within 2 hours. One hundred fifty ml. n-heptane was used to wash the reaction mixture into a centrifuge bottle. The mixture was centrifuged and the heptane phase was separated from the lower acetonitrile and salt phases. The heptane was removed on a rotary evaporator and there was obtained 25 g. of dimeryl isocyanate product which had a % NCO of 14.6 (titration with di-n-butylamine), % Cl (ionic) of 0.00 and % isocyanate (infrared) of 96.5%. The indicated analytical procedures were also used in the Examples to follow.

EXAMPLE II

Thirty-one grams (0.1 eq.) of dimer acid chloride as used in Example I, 7.15 g. (0.11 eq.) sodium azide and 3 ml. acetonitrile were added to a reaction flask and heated. At 50°C. gas began to evolve and an exothermic reaction caused the temperature of the reaction mixture to rise to 98°C. before subsiding. The temperature was controlled between 78°–90°C. for 24 hours, by which time infrared analysis revealed conversion of acid chloride to be essentially complete. The mixture was allowed to cool to room temperature and filtered. The filtrate was stripped to a constant weight on a rotary evaporator. Twenty-four grams of dimeryl isocyanate product was obtained, said product having an NCO content of 13.2% and a Cl content of 0.13%.

EXAMPLE III

Example I was essentially repeated using 92.3 g. (0.30 eq.) of the dimer acid chloride, 21.5 g. (0.33 eq.) sodium azide and 250 ml. acetonitrile. The reaction mixture was refluxed for 24 hours by which time conversion of most of the dimer acid chloride appeared to have occurred. Eighty grams of the dimeryl isocyanate product was obtained having a % NCO of 13.6, % Cl of 0.3 and % diisocyanate of 91.5.

EXAMPLE IV

Nine hundred thirty grams (3.0 eq.) of dimer acid chloride as used in Example I was dropped into a refluxing, stirring slurry of 430 g. (6.6 eq.) sodium azide and 1250 ml. acetonitrile over a period of 30 minutes. The reaction was followed by measuring the evolution of gas and by infrared analysis. Gas evolution was vigorous during the addition, then slowed somewhat. The mixture was refluxed for 60 minutes after the addition, by which time infrared analysis revealed the complete loss of acid chloride. Two liters of n-heptane were added to the reaction mixture and the liquid phases were transferred to a separatory funnel. The salts from the reaction mixture were rinsed with heptane (1 l.) which was also added to the separatory funnel. The lower acetonitrile phase (1,080 ml.), saturated with heptane, was removed and the acetonitrile remaining in the heptane phase was removed by azeotropic distillation (280 ml.). Thus 1,360 ml. acetonitrile saturated with heptane was recovered. The heptane was removed from the dimeryl isocyanate product on a rotary evaporator. There was obtained 848 g. of product having a % NCO of 13.9, a % Cl of 0 and a % diisocyanate of 92. The crude dimeryl isocyanate product was distilled on a 2 inch ASCO wiped film still to give approximately an 87% distillate and residue having the following analyses:

| | |
|---|---|
| Distillate | |
| % NCO | 14.4 |
| % Diisocyanate | 98 |
| Residue | |
| % NCO | 5.7 |

EXAMPLE V

Example IV was essentially repeated except that only 215 g. (3.3 eq.) sodium azide was used. Total reflux time was 5 hours, by which time there appeared only a slight acid chloride absorption by infrared. There was obtained 834 g. of dimeryl isocyanate product having the following analyses: % NCO — 13.9, % Cl (ionic) — 0.19 and % diisocyanate — 90. The crude product was distilled and analyzed as in Example IV.

| | |
|---|---|
| Distillate (88%) | |
| % NCO | 14.8 |
| % Cl | 0.00 |
| % Diisocyanate | 98.5 |
| Residue | |
| % NCO | 5.6 |
| % Cl | 0.003 |

EXAMPLE VI

Example I was essentially repeated using 310 g. (1.0 eq.) of the dimer acid chloride, 143 g. (2.2 eq.) sodium azide and 313 ml. acetonitrile. After conversion of the dimer acid chloride was complete (within 1 hour), most (295 ml.) of the acetonitrile was recovered by distillation until the temperature of the reaction mixture reached 135°C. Then n-heptane (1 l.) was added and the remainder of the acetonitrile saturated with heptane (9 ml.) was recovered by azeotropic distillation. The heptane solution was filtered and stripped to a constant weight on a rotary evaporator. There was obtained 298 g. of dimeryl isocyanate product which analyzed 13.8% NCO, 0.09% Cl and 92% diisocyanate.

EXAMPLE VII

Example I was essentially repeated using 93.0 g. (0.3 eq.) of the dimer acid chloride, 43 g. (0.66 eq.) sodium azide, 100 ml. acetonitrile saturated with heptane as recovered in Example IV and 25 ml. unused acetonitrile. The conversion of dimer acid chloride was essentially complete in 1 hour to yield 69 g. of dimeryl isocyanate product having the following analyses: % NCO — 13.9, % Cl — 0.02 and % diisocyanate — 92.

EXAMPLE VIII

Example I was essentially repeated using the following reactants:

| | |
|---|---|
| Palmitoyl chloride | 27.5 g. (0.1 eq.) |
| Sodium azide | 7.15 g. (0.11 eq.) |
| Acetonitrile | 40 ml. |

Conversion of the palmitoyl chloride was essentially complete within one hour. The hot reaction mixture (which partitioned to two liquid phases when cooled) was filtered and the filtrate was stripped to a constant weight on a rotary evaporator. There was obtained 24.4 g. of pentadecyl isocyanate (% NCO — 15.4).

EXAMPLE IX

Example VIII was essentially repeated using the following reactants:

| | |
|---|---|
| Sebacoyl chloride | 119.5 g. (1 eq.) |
| Sodium azide | 71.5 g. (1.1 eq.) |
| Acetonitrile | 150 ml. |

The conversion of acid chloride to isocyanate was complete within 1 to 1 ½ hours. There was obtained 97 g. of 1,8-diisocyanatooctane (% NCO — 42.0 and % diisocyanate — 98-9).

EXAMPLE X

Isophthaloyl dichloride (10.2 g., 0.1 eq.) dissolved in 10 ml. acetonitrile was quickly added to a refluxing slurry of 7.15 g. (0.11 eq.) sodium azide, 20 ml. acetonitrile and 75 ml. n-octane. Refluxing was continued for 7 minutes and then the acetonitrile was removed by azeotropic distillation with the octane. The temperature of the reaction mixture rose from 78° to 128°C. during the distillation with vigorous evolution of gas towards the end of the distillation. The total reaction time was 25 minutes. The reaction mixture was filtered and the filtrate was stripped on a rotary evaporator to a constant weight. There was obtained 6.8 g. of m-phenylene diisocyanate (% NCO — 50.7).

EXAMPLE XI

Benzoyl chloride (28.1 g., 0.2 eq.) was added to a stirred slurry of 14.3 g. (0.22 eq.) sodium azide and 50 ml. acetonitrile over a period of 2 minutes. The temperature was maintained below 30°C. although initially it reached 35°C. Stirring was continued for 85 minutes although infrared analysis indicated that conversion of the benzoyl chloride to benzoyl azide was essentially complete within 15 minutes. The reaction mixture was filtered and the filtrate was stripped on a rotary evaporator to a constant weight. There was obtained 28.6 g. benzoyl azide which by infrared analysis contained no obvious impurities.

EXAMPLE XII

Palmitoyl chloride (27.5 g., 0.1 eq.) was added to a mixture of 7.15 g. (0.11 eq.) sodium azide and 50 ml. acetonitrile being cooled with an ice bath between 5°-6 °C. The temperature of the system was allowed to rise to 20°-25°C. while being stirred for 2 hours. Infrared analysis revealed the conversion of acid chloride to be nearly complete at the end of the reaction period. The reaction mixture was cooled to 15°C. and was filtered and the filter cake was washed with methylene chloride. The solvents were then removed on a rotary evaporator below room temperature. There was obtained 27.6 g. of palmitoyl azide product having a melting point of 38°-40°C. and which contained up to 22% isocyanate (infrared analysis).

In summary, the Examples show that: successful results are obtained with proportions of acetonitrile from essentially catalytic quantities to much higher amounts (Examples I–III), reaction rates are faster with large excesses of sodium azide (Examples IV, VI and VII versus I and V); the process can be scaled up (Examples IV and V); recovered acetonitrile, even that which is saturated with a co-solvent, can be effectively reused (Example VII); and a wide variety of isocyanates (Examples I-X) and azides (Examples XI and XII) were successfully prepared.

The embodiments of the invention in which an exclusive property or privilege is claimed are defined as follows:

1. In the process of preparing an organic isocyanate wherein an organic acyl halide is first reacted with an alkali or alkaline earth metal azide to produce an organic acyl azide and the latter is decomposed to the organic isocyanate, the improvement comprising carrying out the reaction of the organic acyl halide and the metal azide in the presence of acetonitrile in an amount sufficient to accelerate the reaction of the organic acyl halide and metal azide.

2. The process of claim 1 wherein the metal azide is sodium azide and the acetonitrile is present in an amount of 10 to 300 percent by weight based on the weight of the organic acyl halide.

3. The process of claim 2 wherein the organic acyl halide is a dimer acid chloride derived from dimerized fat acids prepared by polymerizing ethylenically unsaturated monocarboxylic acids of from 16 to 22 carbon atoms.

4. The process of claim 2 wherein the organic acyl halide is palmitoyl chloride.

5. The process of claim 2 wherein the organic acyl halide is sebacoyl chloride.

6. The process of claim 2 wherein the organic acyl halide is heptadecyl diacid chloride.

7. The process of claim 2 wherein the organic acyl halide is isophthaloyl chloride.

8. The process of claim 1 wherein the metal azide is used in an amount of from more than one to three times the equivalents of organic acyl halide.

9. The process of claim 1 wherein a co-solvent is also employed.

* * * * *